Jan. 12, 1965 ATSUSHI HIGUCHI 3,165,042
MECHANISM FOR OPERATING REFLECTING MIRROR AND LIGHT
SHIELD OF SINGLE LENS REFLEX CAMERA
Filed June 21, 1961

INVENTOR.
ATSUSHI HIGUCHI
BY
ATTORNEY 3,165,042
MECHANISM FOR OPERATING REFLECTING MIRROR AND LIGHT SHIELD OF SINGLE LENS REFLEX CAMERA
Atsushi Higuchi, Yokohama, Japan, assignor to Canon Camera Co., Inc., Tokyo, Japan, a corporation of Japan
Filed June 21, 1961, Ser. No. 118,580
Claims priority, application Japan, July 8, 1960, 35/35,843; July 8, 1960, 35/31,022
3 Claims. (Cl. 95—42)

The present invention relates to mechanism for operating the reflecting mirror and the light shield of single lens reflex cameras interlocked with the diaphragm shutter release mechanism.

Single lens reflex cameras of the diaphragm shutter type have such operations for film exposure that first the diaphragm shutter is closed, the light reflected into the eye-piece being simultaneously interrupted, and the reflecting mirror quickly swings upwardly, then, just after the light shield is set free, the shutter is released; while in the restoring operation, the other members should be returned after the light shield is completely restored into its original position. Conventional reflex cameras have the shortcomings that such operating mechanisms are very complicated and are lacking in positive action.

With a view to removing such defects and rendering it possible to observe the object after as well as before the picture is taken, the object of the present invention is to provide a simple and highly efficient device for actuating the reflecting mirror and the light shield in such a way that the swinging up of the reflecting mirror and the light shield, the picture exposure, and the return of these members positively occur and indeed without failure in the photographic sense, in a sequence of momentary actions in interlocking relation with the release mechanism of the diaphragmatic shutter.

Another object of the present invention is to provide a device for operating the reflecting mirror and the light shield, interlocked in action with a simple and secure driving mechanism of the diaphragm shutter having the charge mechanism, in a way that the actions of closure of the exposure leaves, control of the stop leaves, up-spring of the reflecting mirror and the light shield, exposure, return of the light shield and the reflecting mirror, decontrol of the stop leaves, and release of the exposure leaves, occur sequentially.

Other objects, advantages and features of this invention will become more apparent from the following description of an illustrative embodiment in conjunction with the drawing in which.

Figure 1:
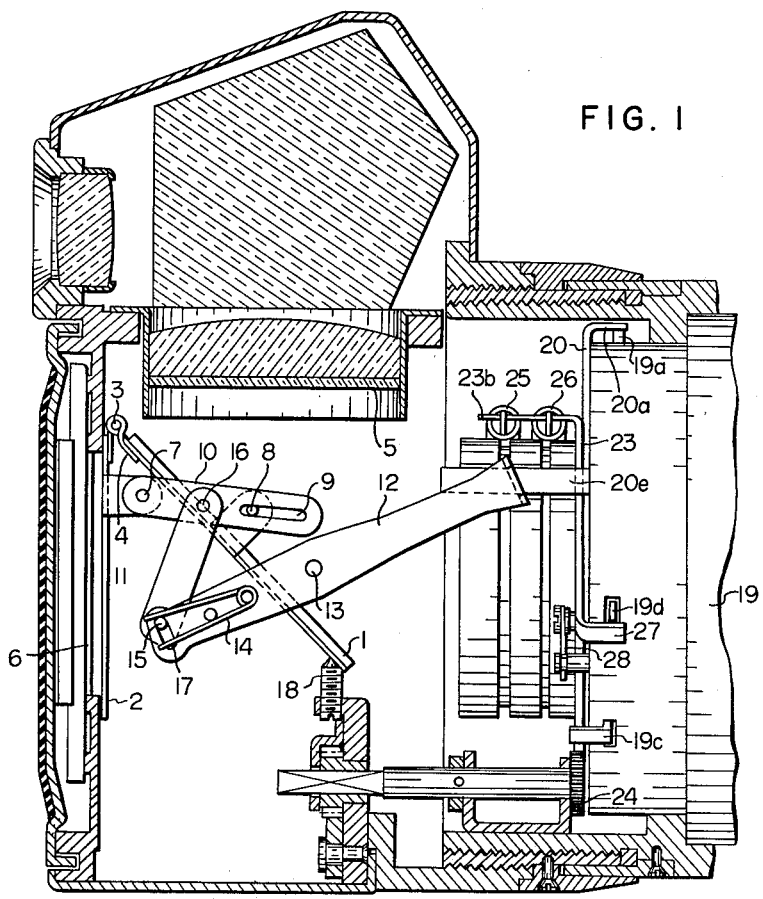
FIGURE 1 is a partial view in section of a single lens reflex camera having an illustrative embodiment of the operation mechanism for the reflecting mirror and the light shield in accordance with the present invention.

The instant mechanism as shown in section in FIG. 1, comprises a reflecting mirror 1, light shield 2, a spring 4 biased to continuously push mirror 1 in the direction where it would cover focussing screen window 5 of the view finder while pushing the light shield to close the exposure aperture 6, and a lever 10 associated with both the mirror 1 and the light shield 2, lever 10 being movable upwardly and downwardly by its midpoint 16 being interlocked with the release mechanism of the diaphragm shutter.

Figure 2:
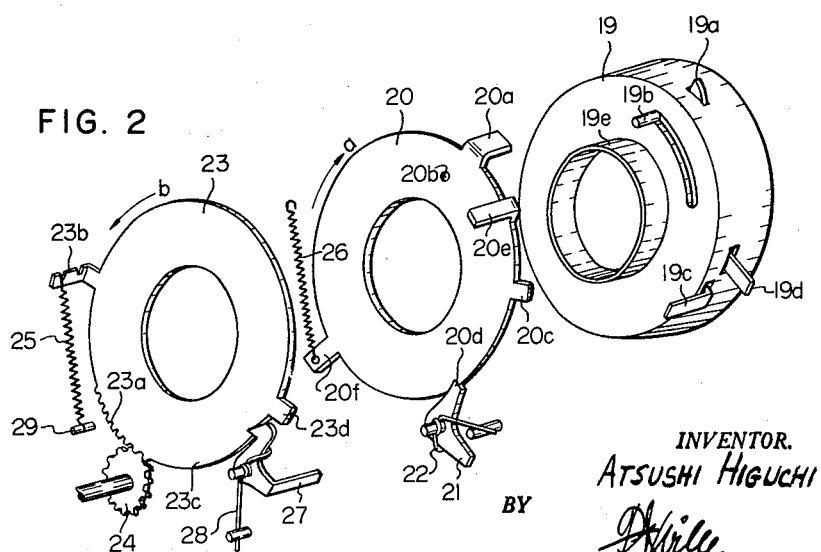
FIGURE 2 is a perspective and exploded view of the driving mechanism operating the diaphragmatic shutter in interlocking relation with that for actuating the reflecting mirror and the light shield of a single lens reflex camera in accordance with the present invention.

For a preferred embodiment of the release mechanism for the diaphragm shutter functioning in interlocking relation as above stated, the invention proposes the simple and positive driving mechanism in which, as illustrated in FIGURE 2, diaphragm shutter 19 is provided with return ring 23 and release ring 20, respectively, having return spring 25 and release spring 26 energizable in interlocking relation with the shutter cocking and releasing mechanism; upon pushing the shutter button, release ring 20 is disengaged from its stop pawl 21, the exposure leaves are shut for action by spring 26, the stop leaves controlled, and simultaneously reflecting mirror 1 and light shield 2, the device for actuating these members being put into action, are thrown upward in succession in this order, then shutter 19 is released to complete the exposure. Then return ring 23 is disengaged by its stop pawl 27 and in the reverse order to that just recited, light shield 2 and reflecting mirror 1 are restored to their original positions, and the stop leaves and the exposure leaves opened.

Reflecting mirror 1 and light shield 2 are mounted, on shaft 3 in such manner, that as stated, spring 4 continuously pushes (a) reflecting mirror 1 in the direction of and to cover focussing screen window 5 of the viewfinder, and (b) light shield 2 in the direction of and to close and cover exposure aperture 6. Lever 10 has one end thereof provided with an aperture through which extends a pin 7 rigidly affixed to light shield 2, the other end of the lever being provided with an elongated aperture 9 which is slidably engaged by pin 8 rigidly affixed to reflecting mirror 1. In addition, lever 10 has a pin 16 rigidly fixed to the center thereof and engaged by link 11 through a bore at one end thereof. At its other end, link 11 has a pin 15 slidably engaged with an elongated aperture 17 of an oscillatory lever 12; the extending end of pin 15 being between the spaced free ends of hairpin-shaped spring 14 disposed on oscillatory lever 12.

Pivot 13 serves as fulcrum for oscillatory lever 12, stop 18 is adjustable for controlling the range of descent for reflecting mirror 1, and interlocking lever 20e being a member attached to release ring 20 of the diaphragm shutter 19. Simultaneously with the descent of lever 20e upon pushing the shutter button down, the exposure leaves are closed, then the stop leaves are controlled to define the prescribed aperture, and in the final stage of descent the exposure leaves are actuated to complete the exposure of the film, the stop leaves ascending on decontrol and, in the final stage of ascent, the exposure leaves open.

In aforesaid mechanism, upon release of the shutter, lever 20e descends from the position illustrated in the figure, lever 12 turns clockwise on pivot 13 and pushes link 11 upwardly by means of spring 14 and pin 15 to the effect that lever 10, by means of pin 16, pushes mirror 1 and shield 2 upwardly and away from the optical axis of the objective. Thus, while spring 4 for light shield 2 acts in the opposite direction to that of the push-up by lever 20e, for mirror 1 it acts in the same direction as that of the push-up by lever 20e. Thus mirror 1 is freed of the restraint of check of lever 10 and instantly moves upwardly, under the bias of spring hinge 4 to the position in which it engages the lower or back surface of focusing screen window 5, thereby intercepting the incident light traveling toward the screen. Then, lever 10 being checked at its one end by pin 8, pushes pin 7 upwardly thereby pushing light shield 2 upwardly against the bias of spring 4 to the position where it contacts the rear face of mirror 1 and thus the exposure aperture 6 is opened completing the preparation for exposure of the film.

Already by this moment, the stop leaves lie in the controlled position as determined by the required stop aperture, they being controlled, that is, moved, as lever continues its descent. With the further descent of lever 20e the exposure leaves acts for exposure. In the meantime lever 12, for clearance of slot 17, pushing to open the lower limb of spring 14, rotates somewhat but does not act upon link 11.

Upon completion of exposure and complete return of lever 20e to its original position, lever 12, link 11 and lever 10 act contrariwise respectively to their above described operating actuation, and shield 2 rapidly restores its original position to close the exposure aperture by the action of spring 4, and then mirror 1, prevailing over the bias of spring 4, descends a sufficient amount until it engages stop 18, enabling the camera user to observe the object photographed immediately after the exposure.

As described, the present invention has it that mirror 1, always tending to swing upwardly and to cover the focussing screen window of the viewfinder, and with the light shield 2 always tending to close the exposure aperture, associated with lever 10, with a slight allowance being given for the engagement of elongated aperture 9 thereof with rigidly fixed pin 8 of mirror 1 to slide, the middle point lying between bearing points 7 and 8 of lever 10 being movable upwardly and downwardly interlocked with the release mechanism for the diaphragm shutter; therefore, upon release of the shutter, first mirror 1 first springs up under the bias of spring 4, then light shield 2 is pushed upward; upon completion of the exposure, shield 2 returns, under spring tension, to shut exposure aperture 6, then mirror 1 is pushed downward. It is a characteristic feature of this mechanism that a highly efficient performance is obtained with a very simple design in which quick return of both the reflecting mirror and the light shield is made to take place without failure in exact and faultless interlocking with the functional actions of the exposure leaves and the stop leaves in such type single lens reflex cameras as have diaphragmatic shutters and light shields.

Next, description is made of the driving mechanism for the diaphragm shutter. Return ring 23 and release ring 20, respectively having return spring 25 and release spring 26, are slidably mounted on axial portion 19e of diaphragm shutter 19, and return spring 25 and release spring 26 are to be energized by being interlocked with the shutter cocking mechanism by means of suitable transmission means as gears 23a, 24, and other members. Diaphragm shutter 19 has lever 19a for actuating the exposure leaves, pin 19b for actuating the stop leaves, release lever 19c and return lever 19d. Release ring 20 has projection 20a, hole 20b for pin 19b to enter, projection 20c, seat 20d for stop pawl 21 to sit, the pawl having spring 22, lever 20e of which the function is above described, and radial projection 20f for anchoring one end of spring 26 thereto. Return ring 23 has spring holder 23b for anchoring one end of each of springs 25 and 26, seat 23c for engagement by stop pawl 27, the latter being biased by spring 28, and radial projection 23d. The other end of spring 25 is anchored to spatially fixed pin 29.

On charging the shutter, return ring 23 is rotated round by gears 24 and 23a contrary to the direction shown by arrow b, energizing springs 25 and 26, till it is stopped at a definite position where seat 23c is engaged with stop pawl 27. Upon pushing the shutter button down, pawl 21 disengages from release ring 20 which now rotates under the tension of spring 26 in the direction shown by arrow a, projection 20a leaves lever 19a, releasing the check of the exposure leaves to the widest aperture ratio to closure, and bore 20b is rotated in position, carrying pin 19b along with it and setting the stop, hole 20b turns round carrying pin 19b and sets the stop leaves to the required stop aperture; simultaneously lever 20e swings reflecting mirror 1 and light shield 2 upwardly. Upon further rotation of release ring 20, projection 20c pushes release lever 19c to release the shutter, and exposure of the film is completed. Successively return lever 19d pushes pawl 27 from engagement with seat 23c, and return ring 23, under the tension of spring 25, rotates in the direction shown by arrow b and projection 23d engages with lever 20e and rotates ring 20 contrary to the direction shown by arrow a, and contrary to the case of release, actuating shutter 19, to restore reflecting mirror 1 and light shield 2 to their original positions, to decontrol of the stop leaves and finally to fully open the exposure leaves. In this way the interlocking of such simple and positively acting device with the previously described device for actuating the reflecting mirror and the light shield makes it possible to confirm the object which has just been photographed immediately after completion of the taking of its picture with the single lens reflex camera.

It will be understood that this invention is not limited to the specific materials, figures, etc., and other details described above and illustrated in the drawing, but can be carried out with various modifications without departing from the scope of the invention, as defined in the appended claims.

What I claim is:

1. In a lens shutter type single reflex camera having a reflecting mirror movable to cover the focusing screen window of the viewfinder and a light shield movable to close the exposure aperture the combination comprising a shaft, spring hinge means rotatable on the shaft and supporting the reflecting mirror and the light shield on the shaft in such manner that the mirror and shield are mutually repelled by the springiness of the hinge means, a first lever connected at its one end region to the light shield and at its other end slidably connected to the mirror, a link hinged at one end to substantially the midregion of the first lever, a second lever pivotally mounted on the camera body and having its one end slidably and pivotally connected to the other end of the link, shutter release means including a release spring and a return spring, the other end of the second lever cooperating with the shutter release means in such manner that normally the light shield closes the exposure aperture and positions the mirror in its position intercepting the exposure light to deflect incident light into the viewfinder and on actuation of the shutter release means the mirror under the bias of the tensioned release spring the mirror is first swung about the shaft and removed from its intercepting position to the position in which it is pressed against and covers the focussing screen of the viewfinder, the light shield pivoting partially to uncover the exposure aperture and then moving upwardly against the bias of the hinge means to be stopped by the mirror when the latter is pressed against the focussing screen completely to uncover the exposure aperture, the shutter then being completely opened to make the exposure and thereupon reclosed by the action of the return spring, the tension of the return spring restoring the light shield to its position closing the exposure aperture and thereupon substantially simultaneously moving the mirror back into its light intercepting position and restoring the shutter to its fully open position.

2. The combination according to claim 1 in which the shutter release means includes a return ring, a return spring connected at one end to the return ring and at its other end to a spatially fixed pin, a release ring, a release spring connected at one end to the release ring and at its other end to the return ring, an individual pawl associated with each ring and engaging its associated ring to permit tensioning of both springs on charging actuation of the shutter release mechanism, means for disengaging its latching pawl from the release ring of the charged shutter release mechanism on manual depression of the exposure button of the camera, and means for disengaging its latching pawl from the return ring after the exposure the result of manual depression of the camera button is made to permit the return ring to rotate under the tension of the return spring and restore the shutter to its preoperated condition.

3. The combination according to claim 2 in which means interlock the shutter release means and the film winding means.

References Cited in the file of this patent
UNITED STATES PATENTS

| | | |
|---|---|---|
| 2,356,880 | Pignone | Aug. 29, 1944 |
| 2,550,698 | King | May 1, 1951 |
| 2,730,025 | Faulhaber | Jan. 10, 1956 |
| 2,992,602 | Heden | July 18, 1961 |